United States Patent
Moeller

(10) Patent No.: US 7,950,495 B2
(45) Date of Patent: May 31, 2011

(54) STEERING SYSTEM AND METHOD FOR ADAPTING RETURN TORQUE RELATIVE TO HAND WHEEL SPEED

(75) Inventor: Bertram Moeller, Bodenheim (DE)

(73) Assignee: Nexteer (Beijing) Technology Co., Ltd.

( * ) Notice: Subject to any disclaimer, the term of this patent is extended or adjusted under 35 U.S.C. 154(b) by 184 days.

(21) Appl. No.: 12/354,874

(22) Filed: Jan. 16, 2009

(65) Prior Publication Data

US 2009/0188744 A1 Jul. 30, 2009

(30) Foreign Application Priority Data

Jan. 25, 2008 (EP) .................................... 08001421

(51) Int. Cl.
*B62D 5/04* (2006.01)
(52) U.S. Cl. .......................... 180/446; 180/443; 701/41
(58) Field of Classification Search ................. 180/443, 180/444, 446; 701/41, 42
See application file for complete search history.

(56) References Cited

U.S. PATENT DOCUMENTS

| | | | |
|---|---|---|---|
| 5,053,966 A * | 10/1991 | Takahashi et al. | 701/41 |
| 7,134,522 B2 * | 11/2006 | Takimoto et al. | 180/446 |
| 7,177,745 B2 * | 2/2007 | Tsuchiya | 701/41 |
| 2002/0060538 A1 | 5/2002 | Hara et al. | |
| 2006/0000663 A1 | 1/2006 | Takimoto et al. | |
| 2008/0047775 A1 * | 2/2008 | Yamazaki | 180/443 |

FOREIGN PATENT DOCUMENTS

| | | |
|---|---|---|
| EP | 1 243 496 A2 | 3/2002 |
| EP | 1 538 065 A2 | 12/2004 |
| EP | 1538065 A2 | 6/2005 |
| EP | 1 767 433 A2 | 9/2006 |
| EP | 1 808 358 A1 | 12/2006 |
| EP | 1767433 A2 | 3/2007 |
| EP | 1808358 A1 | 7/2007 |

OTHER PUBLICATIONS

European Search Report, May 29, 2008.
International Search Report, May 29, 2008.

* cited by examiner

*Primary Examiner* — Paul N Dickson
*Assistant Examiner* — Marc A Scharich
(74) *Attorney, Agent, or Firm* — Cantor Colburn LLP

(57) ABSTRACT

A method for generating a return torque signal in an electric servo steering system of a vehicle, including the steps of: determining a current steering wheel position; determining a current vehicle speed; generating a return torque signal as a function of the steering wheel position and the vehicle speed; determining a current speed of steering wheel rotation; determining a scaling factor dependent on the speed of steering wheel rotation; and multiplying the return torque signal by the scaling factor in order to obtain a modified return torque signal. Also, a servo steering system which is designed to carry out such a method.

11 Claims, 2 Drawing Sheets

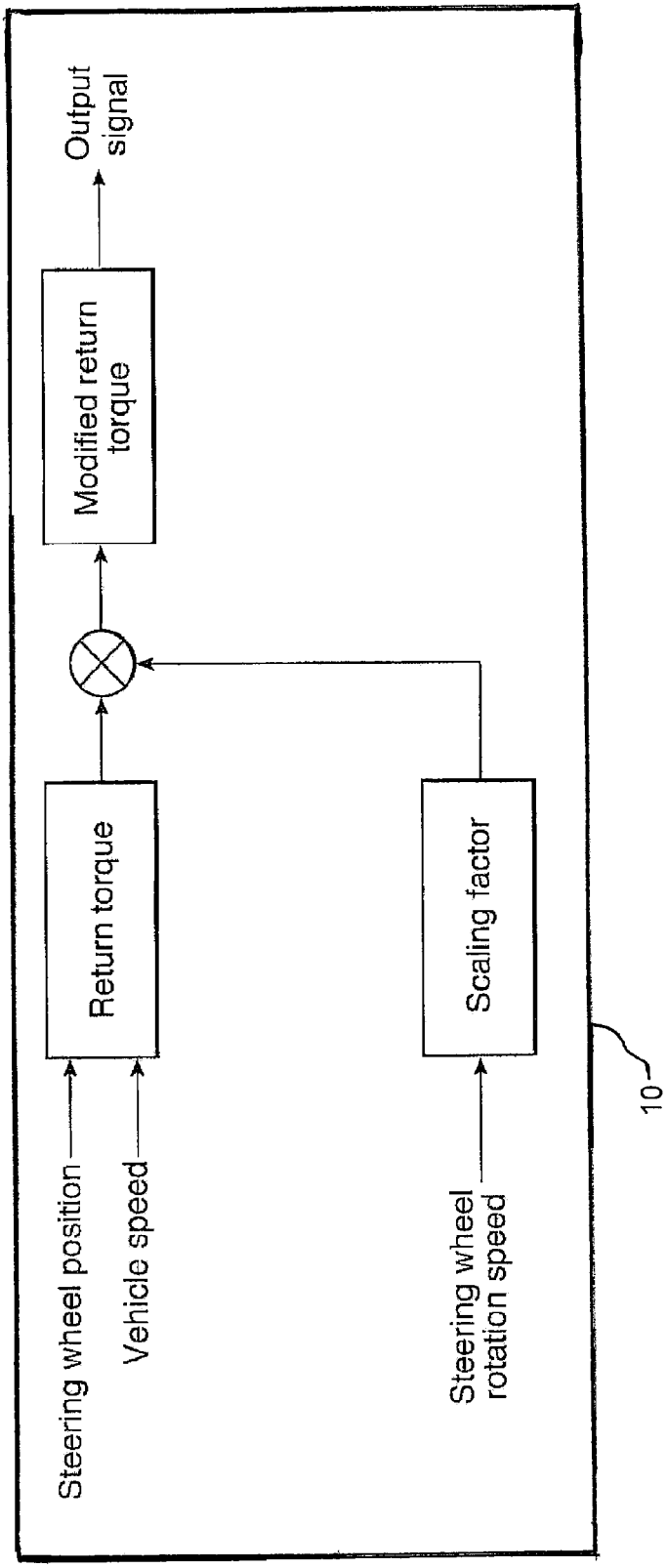

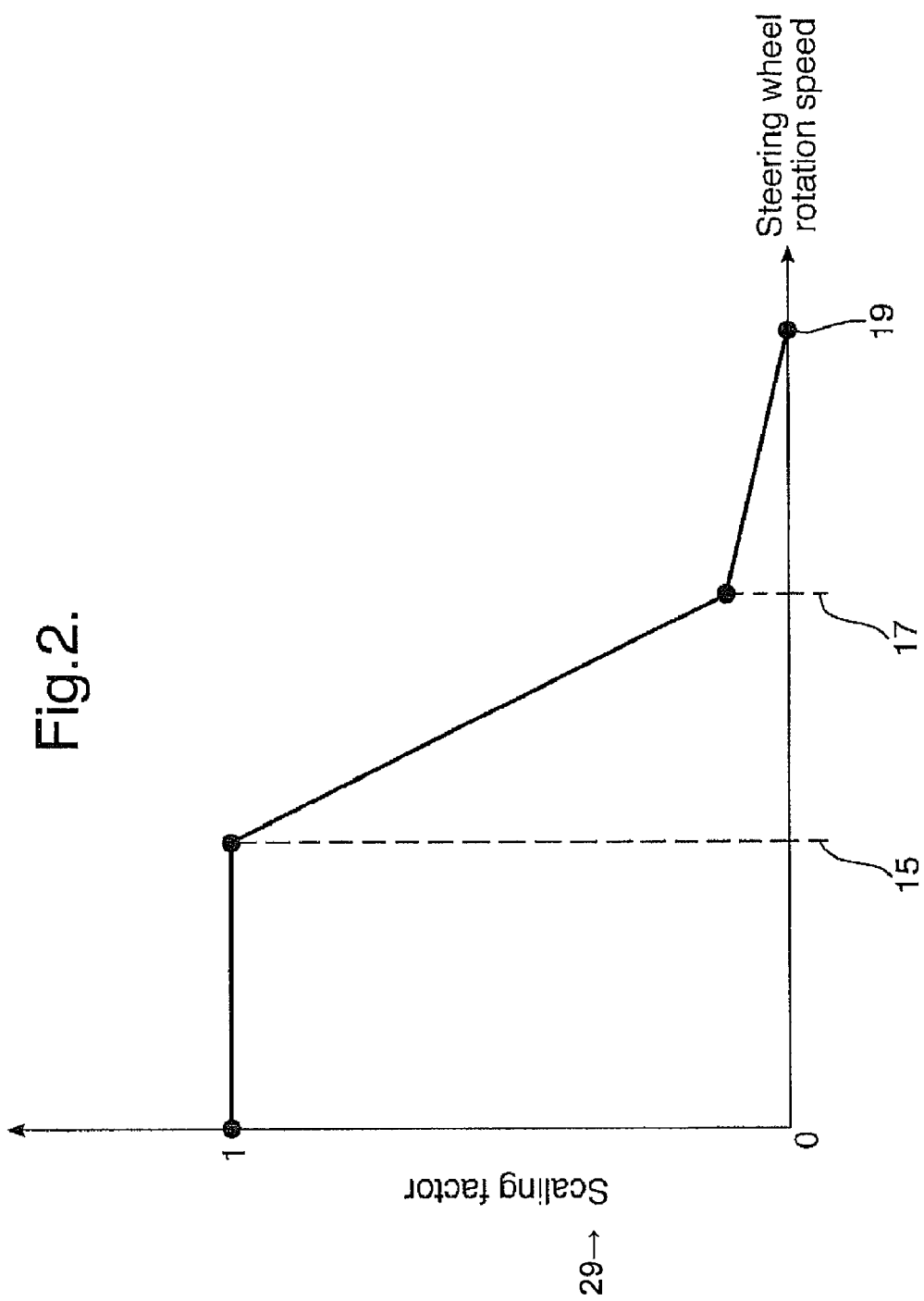

STEERING SYSTEM AND METHOD FOR ADAPTING RETURN TORQUE RELATIVE TO HAND WHEEL SPEED

FIELD OF THE INVENTION

The present invention concerns steering systems and methods for generating a return torque signal in the case of, in particular, an electric servo steering system of a vehicle.

BACKGROUND OF THE INVENTION

In vehicles which are equipped with a servo steering system such as, e.g., electric servo steering, on the basis of a torque exerted on the steering wheel by the driver there is produced a supporting torque which decreases the effort required for steering and so increases the driving comfort. The supporting torque can have superimposed on it a return torque which serves to support the natural restoring movement of the wheels towards the neutral position straight ahead, and so make it easier to keep to the lane during driving. The amount of the return torque is usually predetermined by a return torque signal which is generated by a control device. With known servo steering systems, the return torque signal is, for example, generated as a function of the current steering wheel position and the current vehicle speed.

A return torque determined in this way may, however, be disadvantageous in certain driving situations. If, for example, the vehicle is accelerated during a restoring operation, then the natural restoring force increases and the movement of the steering wheel towards the neutral position may increase undesirably quickly. Conversely, at low speeds the return torque may be too low to maintain the restoring movement or set it in motion. Further, usually a high return torque is necessary with low steering angles, because here the automatic restoring force is small. If, however, the driver performs steering maneuvers within this range around the neutral position, then a rigid steering feel or undesirably quick restoring movement of the steering wheel may occur.

SUMMARY OF THE INVENTION

It is therefore the object of the invention to generate a better-adapted return torque signal in order to eliminate the above disadvantages.

This object is achieved in an electric servo steering system of a vehicle, by a method for generating a return torque signal including the steps of: determining a current steering wheel position; determining a current vehicle speed; generating a return torque signal as a function of the steering wheel position and the vehicle speed; determining a current speed of steering wheel rotation; determining a scaling factor dependent on the speed of steering wheel rotation; and multiplying the return torque signal by the scaling factor in order to obtain a modified return torque signal.

According to the invention, a current speed of steering wheel rotation is determined, a scaling factor dependent on the speed of steering wheel rotation is determined, and the return torque signal is multiplied by the scaling factor in order to obtain a modified return torque signal.

By taking into consideration the speed of steering wheel rotation when generating the return torque signal, the conflict between inadequate return at low steering wheel speeds and excessive restoration at high steering wheel speeds can be resolved. As a result it is possible to meet the special requirements of different driving situations and so improve the driving comfort.

Preferably, the scaling factor is determined on the basis of a dependence on the speed of steering wheel rotation, which is provided by a steady and monotonously falling functional relationship. The return torque signal is therefore evenly modified when the speed of steering wheel rotation changes, in order to ensure a non-jerky steering feel. Further, at high speeds of steering wheel rotation, a scaling factor determined in this way is lower than at low speeds of steering wheel rotation. At low speeds of steering wheel rotation, therefore, the high return torque necessary for return is outputted, while at the same time an undesirably high restoring force or undesirably quick restoring movement at high speeds of steering wheel rotation is avoided.

According to a preferred embodiment, the scaling factor is determined on the basis of a dependence on the speed of steering wheel rotation which is linear in sections. A dependence which is linear in sections can be implemented in a particularly simple and reliable manner in a control system, as no complex calculations are necessary.

Preferably, the scaling factor is set at a constant value when the speed of steering wheel rotation is lower than a first threshold value. Particularly preferably, the scaling factor is in this case set to approximately 1. At speeds of steering wheel rotation that are so low that the problem of undesirably high restoring force which underlies the invention cannot arise, unnecessary modification of the return torque signal is therefore dispensed with.

Preferably, at a predetermined maximum speed of steering wheel rotation the scaling factor is set to approximately 0. This means that, from a given speed of steering wheel rotation onwards, no return torque is outputted and hence, for example, an offensive driving maneuver, i.e., a driving situation in which the driver performs a deliberately fast turning of the hand wheel (during, for example, an obstacle avoidance or quick lane change), is not affected by the return torque. It is desirable that such a maneuver not be delayed or impeded by any return torque, and therefore the return torque is preferably zeroed if the control device detects hand wheel rotation exceeding a predetermined maximum speed.

According to a preferred embodiment, the scaling factor is determined on the basis of a first linear dependence on the speed of steering wheel rotation when the speed of steering wheel rotation is higher than a first threshold value and lower than a second threshold value. Between the first and second threshold values can be, for example, the range which is particularly relevant to adaptation of the return torque signal. Within this range, therefore, proportional adaptation takes place.

According to a further preferred embodiment of the invention, the scaling factor is determined on the basis of a second linear dependence different from the first linear dependence when the speed of steering wheel rotation is higher than the second threshold value. Speed-dependent modification of the return torque can thus be graded more finely and therefore adapted more precisely.

Preferably, the first dependence and the second dependence are predetermined in such a way that the first dependence is characterized by a higher pitch than the second dependence. In the region of high speeds of steering wheel rotation, in which only a relatively low return torque is outputted anyway, smoother modification can therefore take place.

Preferably, the first threshold value is preset at an amount between 70 and 110°/s, and the second threshold value is preset at an amount between 240 and 300°/s. Grading of the return torque modification on the basis of this range division proved to be particularly appropriate.

The object is further achieved by a servo steering system which is designed to carry out a method according to the invention.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a schematic block diagram of a servo steering control system which carries out the method according to the invention; and FIG. 2 is a diagram which shows by way of example a dependence of the scaling factor on the speed of steering wheel rotation.

DETAILED DESCRIPTION OF THE INVENTION

The method shown schematically in FIG. 1 can be carried out, for example, in the control device of an electric servo steering system 10 of a motor vehicle, as known from the state of the art. Electric servo steering systems provide a steering torque by means of an electric motor or other electric actuating element coupled directly or indirectly to the steering gear. The amount of torque is determined with the aid of torque signals which are generated by the control device. For instance, a supporting torque signal, a damping torque signal and a return torque signal can be generated, which are superimposed by the control device in order to generate a total torque output signal which is outputted to the electric motor.

The control device receives different signals from vehicle sensors. In particular, on the vehicle, not shown, are provided sensors for measuring the current steering wheel position, the current vehicle speed and the current speed of steering wheel rotation. The speed of steering wheel rotation can, for example, be determined from the variation in time of the steering wheel position or steering angle. In addition, the control device can also receive further inputs such as, e.g., the torque exerted on the steering wheel by the driver.

A return torque signal is generated as a function of the steering wheel position and the vehicle speed. The return torque signal generated is modified on the basis of a scaling factor or multiplier as in FIG. 1, which is dependent on the speed of steering wheel rotation. The scaling factor is determined on the basis of a special dependence, which is shown by way of example in the diagram of FIG. 2. In the diagram, the scaling factor is plotted as a function of the speed of steering wheel rotation. It can be seen that the dependence is linear in sections: the higher the current speed of steering wheel rotation, the lower the scaling factor is selected. Instead of the dependence which is linear in sections as shown, any other, but preferably steady and monotonously falling functional relationship can be selected. On the abscissa of the diagram are defined a first threshold value 15 and a second threshold value 17. Further, a maximum speed of steering wheel rotation 19 is defined, which can, for example, correspond to the upper limit of the measuring range of the sensor.

After determination of the current speed of steering wheel rotation, the control system checks whether the speed of steering wheel rotation is lower than the first threshold value 15. If the speed of steering wheel rotation is lower than the first threshold value 15, the scaling factor is set to a constant value of 1. Then the control system checks whether the maximum speed of steering wheel rotation 19 is reached. If so, the scaling factor is set to 0. If the speed of steering wheel rotation is higher than the first threshold value 15, the control system checks whether the speed of steering wheel rotation is lower than the second threshold value 17. If so, the scaling factor 29 is determined on the basis of a first linear dependence on the speed of steering wheel rotation. If the speed of steering wheel rotation is higher than the second threshold value 17, but lower than the maximum value 19, the scaling factor is determined on the basis of a second linear dependence. In FIG. 2 it can be seen that the first linear dependence differs from the second linear dependence. In particular, the two dependences are predetermined in such a way that the first dependence is characterized by a higher pitch than the second dependence. If the application so requires, the scaling factor can alternatively already be set to 0 from the second threshold value 17 onwards. Similarly it is conceivable that the scaling factor on reaching the maximum speed of steering wheel rotation 19 is set not to 0, but to a predetermined minimum value. An advantageous amount for the first threshold value is approximately 100°/s, while an advantageous amount for the second threshold value is approximately 270°/s. These values may however be adapted in any desired manner to the respective vehicle properties or a selected mobility mode.

The dependence of the scaling factor on the speed of steering wheel rotation, which is linear in sections as shown, allows particularly easy implementation and rapid execution. In particular, the dependence is fully defined by only four points or supporting points. These supporting points can, for example, be obtained from a look-up table which is easy to update with respect to the steering behavior in the case of desired changes. If, however, it is necessary with respect to the specific application, it is possible without problems to refine the dependence and hence the return torque modification in any desired manner, for example by further sections to be defined or in the form of a continuous function of sigmoid shape, for example.

In general, the invention allows an improvement of the return support function of servo steering systems, in particular avoiding a rigid steering feel and excessively quick restoring rotation of the steering wheel.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or system to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for generating a return torque signal in an electric servo steering system of a vehicle, comprising the steps of:
   determining a current steering wheel position;
   determining a current vehicle speed;
   generating a return torque signal as a function of the steering wheel position and the vehicle speed;
   determining a current seed of steering wheel rotation,
   determining a scaling factor dependent on the speed of steering wheel rotation; and
   multiplying the return torque signal by the scaling factor in order to obtain a modified return torque signal, wherein the scaling factor is set at approximately 0 at a predetermined maximum speed of steering wheel rotation.

2. A method according to claim 1, wherein the scaling factor is determined on the basis of a first linear dependence on the speed of steering wheel rotation, if the speed of steering wheel rotation is higher than a first threshold value and lower than a second threshold value.

3. A method according to claim 2, wherein the scaling factor is determined on the basis of a second linear dependence different from the first linear dependence, if the speed of steering wheel rotation is higher than the second threshold value.

4. A method according to claim 3, wherein the first linear dependence and the second linear dependence are predetermined in such a way that the first linear dependence is characterized by a higher pitch than the second linear dependence.

5. A method according to claim 1, wherein the scaling factor is set at a constant value when the speed of steering wheel rotation is lower than a first threshold value.

6. A method according to claim 5, wherein the scaling factor is set at approximately 1 when the speed of steering wheel rotation is lower than a first threshold value.

7. A method according to claim 1, wherein the scaling factor is determined on the basis of a dependence on the speed of steering wheel rotation, which is provided by a steady and monotonously falling functional relationship.

8. A method according to claim 1, wherein the scaling factor is determined on the basis of a dependence on the speed of steering wheel rotation which is linear in sections.

9. A servo steering control system which is designed to carry out a method according to claim 1.

10. A method for generating return torque signal in an electric servo steering system of a vehicle, comprising the steps of:
    determining a current steering wheel position;
    determining a current vehicle speed;
    generating a return torque signal as a function of the steering wheel position and the vehicle speed;
    determining a current speed of steering wheel rotation;
    determining a scaling factor dependent on the speed of steering wheel rotation; and
    multiplying the return torque signal by the scaling factor in order to obtain a modified return torque signal, wherein the scaling factor is determined on the basis of a first linear dependence on the speed of steering wheel rotation, if the speed of steering wheel rotation is higher than a first threshold value and lower than a second threshold value, and wherein the first threshold value is preset at an amount between about 70 and about 110 degrees per second.

11. A method for generating return torque signal in an electric servo steering system of a vehicle, comprising the steps of:
    determining a current steering wheel position;
    determining a current vehicle speed;
    generating a return torque signal as a function of the steering wheel position and the vehicle speed;
    determining a current speed of steering wheel rotation;
    determining a scaling factor dependent on the speed of steering wheel rotation; and
    multiplying the return torque signal by the scaling factor in order to obtain a modified return torque signal, wherein the scaling factor is determined on the basis of a first linear dependence on the speed of steering wheel rotation, if the speed of steering wheel rotation is higher than a first threshold value and lower than a second threshold value, and wherein the second threshold value is preset at an amount between about 240 and about 300 degrees per second.

* * * * *